United States Patent
Dhoolia et al.

(10) Patent No.: US 11,164,574 B2
(45) Date of Patent: Nov. 2, 2021

(54) CONVERSATIONAL AGENT GENERATION

(71) Applicant: International Business Machines Corporation, Armonk, NY (US)

(72) Inventors: Pankaj Dhoolia, Ghaziabad (IN); Ajay Kumar Gupta, New Delhi (IN); Danish Contractor, Gurgaon (IN); Dinesh Raghu, New Delhi (IN); Sachindra Joshi, Gurgaon (IN); Vineet Kumar, Faridabad (IN); Dhiraj Madan, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 335 days.

(21) Appl. No.: 16/239,070

(22) Filed: Jan. 3, 2019

(65) Prior Publication Data
US 2020/0219494 A1    Jul. 9, 2020

(51) Int. Cl.
*G10L 15/16* (2006.01)
*G10L 15/22* (2006.01)
(Continued)

(52) U.S. Cl.
CPC .............. *G10L 15/22* (2013.01); *G10L 15/16* (2013.01); *G10L 15/1815* (2013.01); *G10L 15/30* (2013.01); *G10L 2015/223* (2013.01)

(58) Field of Classification Search
CPC ..... G10L 15/22; G10L 15/1815; G10L 15/30; G10L 15/16; G10L 2015/223; G09B 5/12; G06F 3/04842
(Continued)

(56) References Cited

U.S. PATENT DOCUMENTS 10,930,272 B1 *  2/2021  Orkin .................. G10L 15/1815
2016/0349935 A1  12/2016  Gelfenbeyn et al.
(Continued)

OTHER PUBLICATIONS

David Griol et al., "A Neural Network Approach to Intention Modeling for User-Adapted Conversational Agents", Research Article, Computational Intelligence and Neuroscience, 2016, 11 pages, Hindawi Publishing Corporation.
(Continued)

*Primary Examiner* — Md S Elahee
(74) *Attorney, Agent, or Firm* — Ference & Associates LLC

(57) ABSTRACT

One embodiment provides a method, including: obtaining a plurality of conversational logs; generating a human agent emulator and a user emulator; providing a workspace for a conversational agent, so that an agent designer generates a conversational specification for the conversational agent, wherein the generating a conversational specification comprises: receiving a selection, by the agent designer, of at least one intent for the conversational agent, wherein the receiving a selection is responsive to the conversational agent workspace providing suggestions for intents; providing at least one suggestion for a dialog node that corresponds to the selected at least one intent; and generating a dialog flow for the conversational agent, wherein the generating comprises iteratively receiving, from the agent designer, selection of at least one aspect and receiving at least one selection of the at least one suggestion for dialog nodes; and providing the conversational agent.

20 Claims, 3 Drawing Sheets

(51) Int. Cl.
　　　*G10L 15/18*　　　(2013.01)
　　　*G10L 15/30*　　　(2013.01)
(58) Field of Classification Search
　　　USPC .......................................................... 704/232
　　　See application file for complete search history.

(56) References Cited

U.S. PATENT DOCUMENTS

| | | |
|---|---|---|
| 2017/0116982 A1 | 4/2017 | Gelfenbeyn et al. |
| 2018/0121062 A1* | 5/2018 | Beaver ................ G06F 3/04842 |
| 2020/0111377 A1* | 4/2020 | Truong .................... G09B 5/12 |

OTHER PUBLICATIONS

Bing Liu et al., "Iterative Policy Learning in End-to-End Trainable Task-Oriented Neural Dialog Models", arXiv:1709.06136v1 [cs. CL], Sep. 18, 2017, 8 pages.

* cited by examiner

CONVERSATIONAL AGENT GENERATION

BACKGROUND

When a user has a problem or question, the user may interact with a conversational agent, for example, chatbot, digital assistant, virtual assistant, or the like. Conversational agents generally capture text-based input, for example, a user may access a conversational window and provide text input to the window. The conversational agent then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method comprising: obtaining a plurality of conversational logs, each of the conversational logs representing interactions between at least one user and at least one human agent; generating, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance; providing a workspace for a conversational agent, so that an agent designer generates a conversational specification for the conversational agent, wherein the conversational specification identifies (i) at least one intent of the conversational agent and (ii) a dialog flow for the conversational agent, wherein the generating a conversational specification comprises: receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs; providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and providing, within the conversational agent workspace, the conversational agent having the conversational specification for deployment.

Another aspect of the invention provides an apparatus, comprising: at least one processor; and a computer readable storage medium having computer readable program code embodied therewith and executable by the at least one processor, the computer readable program code comprising: computer readable program code configured to obtain a plurality of conversational logs, each of the conversational logs representing interactions between at least one user and at least one human agent; computer readable program code configured to generate, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance; computer readable program code configured to provide a workspace for a conversational agent, so that an agent designer generates a conversational specification for the conversational agent, wherein the conversational specification identifies (i) at least one intent of the conversational agent and (ii) a dialog flow for the conversational agent, wherein the generating a conversational specification comprises: receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs; providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and computer readable program code configured to provide, within the conversational agent workspace, the conversational agent having the conversational specification for deployment.

An additional aspect of the invention provides a computer program product, comprising: a computer readable storage medium having computer readable program code embodied therewith, the computer readable program code executable by a processor and comprising: computer readable program code configured to obtain a plurality of conversational logs, each of the conversational logs representing interactions between at least one user and at least one human agent; computer readable program code configured to generate, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance; computer readable program code configured to provide a workspace for a conversational agent, so that an agent designer generates a conversational specification for the conversational agent, wherein the conversational specification identifies (i) at least one intent of the conversational agent and (ii) a dialog flow for the conversational agent, wherein the generating a conversational specification comprises: receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs; providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and computer readable program code configured to provide, within the conversational agent workspace, the conversational agent having the conversational specification for deployment.

A further aspect of the invention provides a method, comprising: providing a workspace for generating a conversational agent to interact with users; receiving, within the workspace, an objective selection, by an agent designer, of an objective for the conversational agent, wherein the receiving an objective selection is responsive to providing, by the workspace, a suggestion for an objective created by mining a plurality of conversational logs detailing interactions between a user and a human agent; receiving, within the workspace, a node selection of a dialog node for the conversational agent by the agent designer, wherein the receiving a node selection is responsive to providing, by the workspace, a suggestion for a dialog node generated by providing the objective to an agent emulator that emulates a response of the agent identified from the plurality of conversational logs; creating, within the workspace, a dialog flow for the conversational agent by iteratively (i) providing intent suggestions corresponding to the objective selection, (ii) receiving selections of intent suggestions by the agent designer, and (iii) receiving node selections responsive to providing dialog node suggestions corresponding to the intent selections; and generating the conversational agent from a conversational specification generated from the dialog flow and the objective selection.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
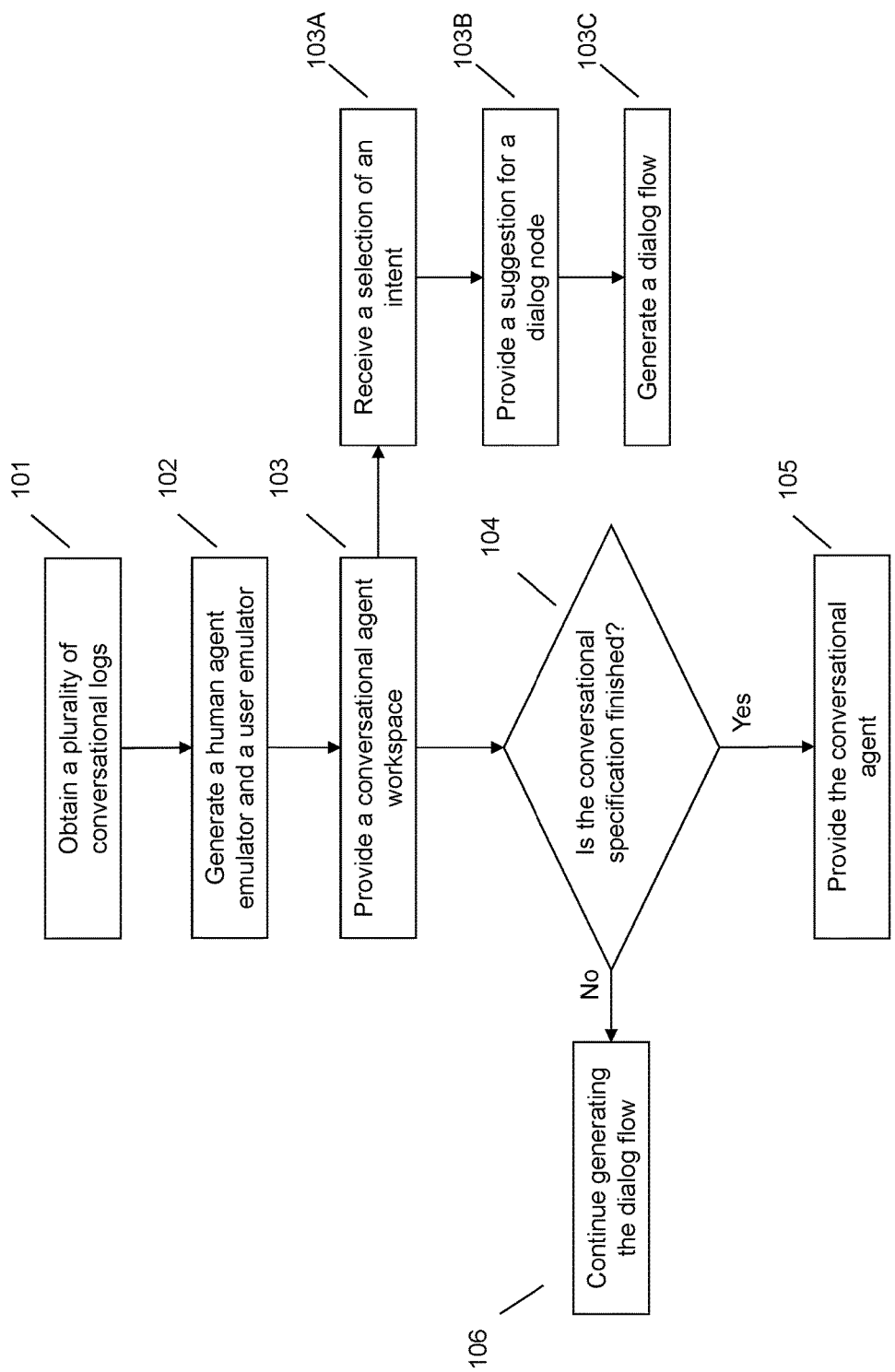
FIG. 1 illustrates a method of generating a conversational agent using a conversational agent workspace that provides suggestions for generating a conversational specification generated from a plurality of conversational logs.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Conversational agent developers develop conversational agents by building a conversational specification. The conversational specifications specify an intent and a dialog or conversational flow. An intent is what the user says or what the user intends to say. In other words, an intent can be identified as an utterance or conversational turn that could be provided by a user of the conversational agent. The conversational or dialog flow identifies how the conversational agent will respond when provided with a particular input from a user. For example, if the user provides input X, then the dialog flow would indicate how the conversational agent should respond to that input X. The dialog flow can have different dialog nodes that allow the conversational agent to respond to different inputs that can be provided by the user. As the conversation progresses, the conversational agent processes input received from a user and accesses a node within the dialog flow that is responsive to the received input. Thus, within the conversational specification the agent developer creates the nodes and provides an algorithm to the conversational agent so that the conversational agent can select and traverse nodes of the dialog flow in response to intents provided by the user. Once both the intent and the dialog flow are identified the conversational agent can be created from the conversational specification.

However, designing the conversational specification is a lengthy and time-consuming process for designers because the developer has to identify what intents need to be included and how the dialog flow should be designed. Conventional systems provide a workspace where the developer can work to create the conversational specification. Such a workspace makes it easier for the developer to add nodes to the conversational specification. However, the developer must develop the nodes and determine where these nodes should be within the dialog flow. Many times this results in dialog flows that are ineffective, thereby leaving users of the conversational agent frustrated due to the lack of responsiveness by the conversational agent. Thus, the developers have to monitor the use of the conversational agent and adjust the dialog flow as problems arise. Additionally, in traditional systems the dialog chosen for the dialog nodes is generally created based upon a domain knowledge of the developer, which may result in nodes that are not accurate reflections of input that may be provided by a user, thereby resulting in dialog nodes that are never accessed or receipt of input that the conversational agent is unable to process.

Accordingly, the techniques and systems as described herein provide a system and technique for generating a conversational agent using a conversational agent workspace that provides suggestions for generating a conversational specification generated from a plurality of conversational logs. The system obtains a plurality of conversational logs that represent interactions between users and a human agent. From the conversational logs the system can generate a human agent emulator, which can provide a next possible utterance from the perspective of the human agent and a user emulator, which can provide a next possible utterance from the perspective of a user. These next possible utterances are identified from the conversational logs and are based upon a sequence of the utterances that have occurred up to this current point in the conversation. The system then provides a conversational agent workspace that allows a developer or designer to generate a conversational specification for the conversational agent. The conversational specification identifies an intent and dialog flow for the conversational agent. To generate the conversational specification the system provides suggestions for an intent to be used with the conversational agent. These suggested intents are generated by mining the plurality of conversational logs to identify things that a user has said to a human agent within a particular domain. After the designer selects an intent, the system can provide a suggestion for a dialog node that corresponds to the selected intent. In other words, if the intent represents something said by a user, the dialog node represents something that would have been said by the human agent, and therefore, a response that is recommended to be provided by the conversational agent. To generate the suggestion(s), the system provides the intent to the agent emulator and the agent emulator provides possible responses that may have been provided by a human agent. The dialog flow for the conversational agent can then be generated by iteratively providing dialog nodes to a user emulator to receive suggestions for intents and aspects (also referred to as sub-intents) providing a selection of the suggestion for an intent or aspect from a developer, and providing the selection to an agent emulator to receive a suggestion for a dialog node. Once the conversational specification is generated, the system can provide a conversational agent for deployment within the conversational agent workspace.

Such a system provides a technical improvement over current systems for generation of conversational agents. Rather than relying on the domain expertise of a developer, the system provides suggestions for dialog nodes and a dialog flow based upon conversational logs detailing interactions between a user and a human agent. From the conversational logs the system may generate a user emulator and an agent emulator, which allows the system to suggest dialog nodes that should be added to the dialog flow. Thus, the described system provides a more efficient system for generating a conversational agent. Additionally, the described system provides a workspace for generating a conversational agent dialog flow that is more accurate with respect to inputs that may be provided by a user because the intents are based upon conversational logs where a user has provided a response.

FIG. 1 illustrates a method for generating a conversational agent using a conversational agent workspace that provides suggestions for generating a conversational specification generated from a plurality of conversational logs. At 101 the system may obtain a plurality of conversational logs that represent interactions between at least one user and at least one human agent. Obtaining the conversational logs may include a user providing the conversational logs to the system, for example, uploading the information to the system, providing the information to a data storage location accessible by the system, or the like. Alternatively, the system may proactively capture or obtain the information, for example, by accessing a repository associated with the dialog application where the user and human agent conversed, running as a background application with the dialog application, or the like. Obtaining the conversational logs may include any combination of the identified techniques or any other technique that can be used to obtain the conversational logs. The conversational logs may also be received while the dialog application is live or deployed. In other words, the described system does not require that the dialog application is taken out of service in order to analyze the conversational logs.

The conversational logs may include transcripts or other logs that correspond to interactions between users and the human agent. In other words, while the dialog application is deployed, the dialog application or other system associated with the dialog application records information related to the dialog application, including recording interactions between users and the human agent. These recorded interactions may include a transcript of the input, response, or utterance provided by the user and then the response provided by the human agent. Each of the responses provided by either the user or the human agent may be referred to as a conversational turn or utterance. The recorded interactions may include additional information, for example, a timestamp of when each conversational turn is received/provided, identification information identifying the user and/or human agent, metadata associated with the responses or human agent, and the like.

The system provides a conversational agent workspace that allows a developer to configure conversational frames for a given domain, thereby generating a conversational agent that can converse with humans. Within the conversational agent workspace a bootstrapping service is created by first identifying a domain or workspace name. For example, a developer may specify that the domain is a technical support domain, a customer service domain, a purchasing domain, or the like. The developer can also identify where a set of service endpoints is hosted, for example, as a uniform resource locator (URL), and how to access the URLs. The bootstrapping service is then configured. Within the bootstrapping service, the system learns an application program interface (API) in the form of a human agent emulator and a user emulator.

Thus, at 102 the system generates a human agent emulator and a user emulator from the plurality of conversational logs. These emulators may provide a possible next utterance in a conversation that includes a sequence of back-and-forth utterances between the user and the human agent up to this next possible utterance. In other words, the human agent emulator may provide a possible utterance that may be provided by a human agent during a conversation. The user emulator, on the other hand, may provide a possible utterance that may be provided by a user during a conversation. To provide possible utterances the emulators may be trained from the plurality of conversational logs obtained at 101.

For example, to identify possible utterances the system may generate a deep learning model and/or index structure from the conversational logs. A deep learning model is a supervised model of learning where a model developer specifies a set of data that identifies a particular input result in a particular output. In other words, a plurality of inputs, each having a labeled set of outputs, are provided to the deep learning model. From the set of data, the deep learning model learns an algorithm that can be used to respond to inputs that have not been previously seen by the deep learning model. In the context of the present application, the provided inputs include utterances of the conversation as found in the plurality of conversation logs. The labeled set of outputs is the next utterance in the conversation, as based upon the sequence of utterances in the conversation up to this point.

In other words, an input may identify that the current conversational utterance is X, thereby resulting in an output of Y. On the other hand, if the sequence of utterances in the conversation is $X_1$ and $X_2$, the output may be $Y_1$. The deep learning model also understands who said which utterance (e.g., the user, the human agent, etc.) and may also understand other metadata regarding the utterance. To generate the deep learning model and/or the index structure the system obtains the plurality of conversational logs and each conversation is formulated as a series of utterances. In this system, instead of just supplying all utterances to the deep learning model as is done with conventional systems, the system sequences all the conversations before provision to the deep learning model. These sequences are stored in an index structure. The index structure also stores all possible partial sequences. For example, if a conversation sequence is $U_1$, $U_2$, and $U_3$, the index structure stores the following partial sequences: $U_1$; $U_1$ and $U_2$; and $U_1$, $U_2$, and $U_3$. For each of these sequences, the index structure stores the next possible utterance as the output. This information is then provided to the deep learning model. The user emulator and the human agent emulator can then be generated using the deep learning model.

At 103 the system then provides the conversational agent workspace that allows the agent designer to generate a conversational specification for the conversational agent. The conversational specification identifies intents for the conversational agent and a dialog flow for the conversational agent. The described system automatically builds the specification of the conversational agent from the plurality of conversational logs. In other words, the system tries to automatically learn a conversational agent conversational specification using interactions that have occurred between humans (i.e., a user and a human agent).

To generate the conversational specification, the system receives, within the conversational agent workspace, a selection by an agent designer of at least one intent for the conversational agent at 103A. The domain (e.g., technical support, customer service, ordering support, etc.) for the conversational agent has already been identified when creating the bootstrapping service. Thus, the system has gathered the conversational logs that apply to the domain. The system mines these conversational logs to provide suggestions for intents that may be useful for generation of a conversational agent. For example, the system may cluster utterances provided by users within the conversational logs into intent clusters. In other words, when a user first accesses a dialog application to request assistance from a human agent, the user provides a reason or request for assistance. This reason or request for assistance can be identified as the intent or reason for why the user accessed the dialog application. Thus, the system may cluster these initial utterances in order to identify a purpose or intent for the conversational agent.

The clustering may be performed using one or more clustering techniques, for example, distance clustering, similarity clustering, and the like. The intent clusters then contain utterances which have a similarity to other utterances within the cluster. For example, an utterance of "Application X password reset" and an utterance of "I need help resetting my password for Application X" may be identified as having a similar purpose and may, therefore, be clustered within the same intent group. The system may then present a theme or example intent from the intent cluster to the agent designer as a suggestion for an intent of the conversational agent. With the suggestion, the system may provide examples of utterances contained within the intent cluster and a number of utterances that are contained within the intent cluster. The agent designer can then select one of these suggestions or multiple suggestions. If the designer selects multiple suggestions, the designer can indicate that the intent clusters should be merged. For example, if the designer identifies that multiple intent clusters are similar, the designer can identify that the intent clusters should be merged.

Alternatively, the agent designer may provide an agent/user created intent that is separate from the suggestions. Upon selecting an intent from the suggestions or providing a user created intent, the designer can request that the system provide examples of utterances that are similar to the selected intent, which may include the agent created intent. Accordingly, the system may use this selected intent to mine the plurality of conversational logs for utterances that are similar to the selected intent and may display those utterances which are similar. The selected intent, which may include the agent created intent, can then be imported into the workspace.

In response to the designer selecting an intent, the system can provide a suggestion for a dialog node that corresponds to the selected intent at 103B. To generate a suggestion, the system provides the selected intent to the agent emulator and the agent emulator generates a possible response. This possible response is then provided to the designer as a suggestion for a dialog node. In other words, if the intent corresponds to an input that would be provided at a dialog application, the dialog node would correspond to a response that may be provided by a human agent. Thus, the agent emulator is able to provide suggestions of how the conversational agent should respond to the intent based upon the plurality of conversational logs.

The agent emulator may provide multiple suggestions, one or more of which can then be selected by a designer for insertion into the dialog flow as a dialog node. The agent can also select more than one of the multiple suggestions, or provide an agent-created suggestion or dialog node, and identify the priority of the suggestions. In other words, the designer may determine that the conversational agent could respond to an intent in many different ways, each of these ways being represented by a suggestion or user created dialog node. In this case, the designer may prefer that the conversational agent respond using one dialog node over another dialog node. Therefore, the designer can identify the priority of the dialog node to be used by the conversational agent in providing a response.

From the selection of intents and dialog nodes, the system can generate a dialog flow at 103C. To create a dialog flow that includes more than just a single intent node and a single response or dialog node, the system may iteratively provide suggestions and receive selections for additional intents, referred to as aspects or sub-intents, and dialog response nodes. To receive a suggestion for an aspect, the system may provide the last dialog response node that was selected by the designer to the user emulator. The user emulator then provides a possible response that is presented to the designer as a suggestion for an aspect. In other words, if the dialog response node corresponds to what a human agent would say in response to a user input, the user emulator would identify a possible response provided by a user in response to what was said by the human agent. Thus, the user emulator can provide suggestions corresponding to possible responses by a user in response to what the conversational agent has provided as output due to the dialog response node. Once the designer selects a suggestion as a sub-intent, or provides a sub-intent, the system can provide a suggestion for a dialog node based upon the selected sub-intent using the same process described in connection with 103B. The system then receives a selection for a dialog node from the designer and this process continues until the designer is satisfied with the dialog flow.

Figure 2:
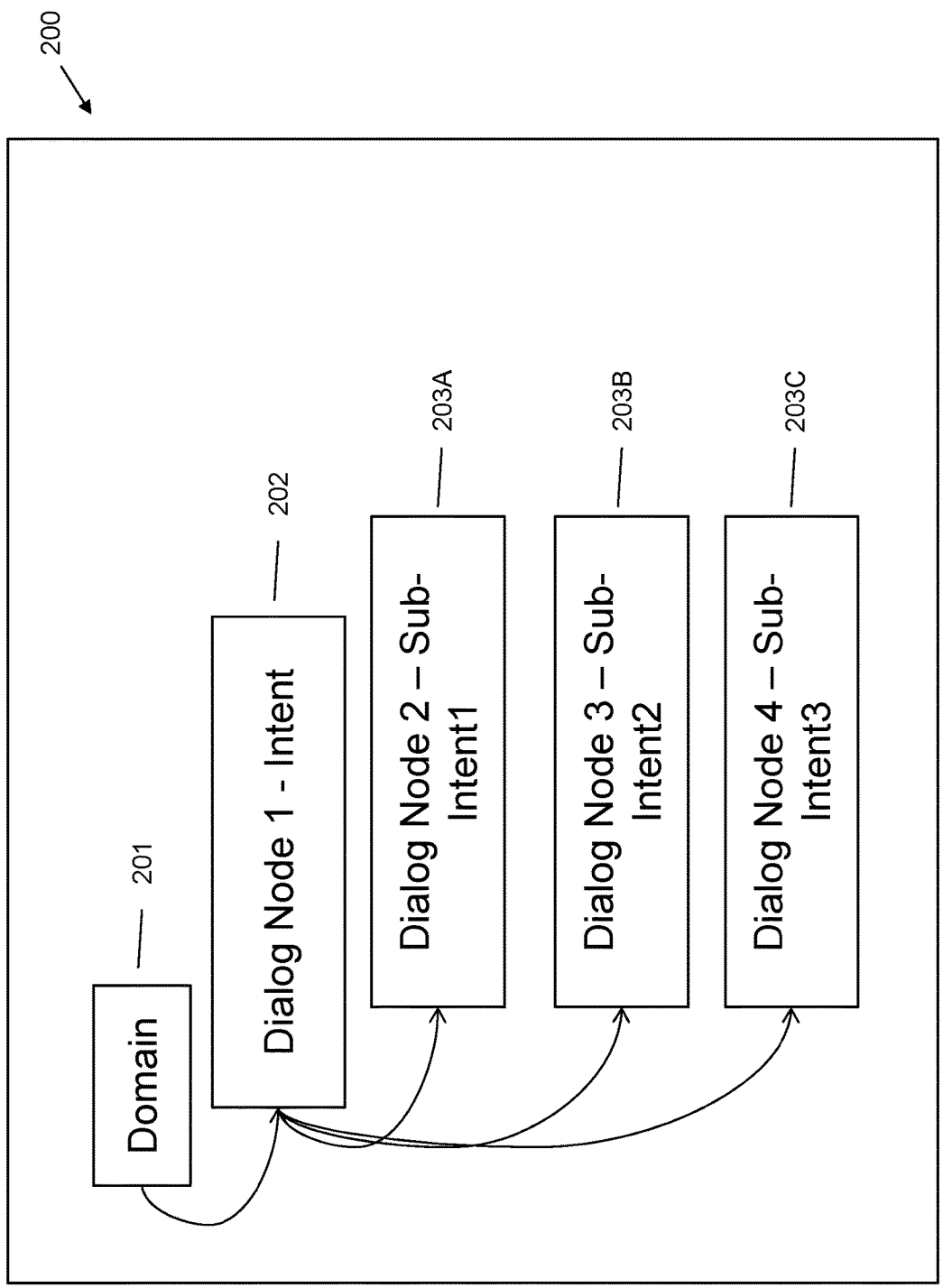
FIG. 2 illustrates an example conversational agent workspace.

An example dialog flow is shown in FIG. 2. The system provides the workspace 200 that includes a display of the current dialog flow. The domain 201 is identified with dialog node 1 corresponding to the initial intent 202. The dialog flow then includes aspects represented by dialog node 2 203A, dialog node 3 203B, and dialog node 4 203C. FIG. 2 represents a very simplistic example and it should be understood that the workspace can include additional icons and information, for example, icons to add nodes, icons to add folders, headers that can be selected to illustrate entities, headers that can be selected to illustrate intents, and the like. Additionally, the dialog flow may be more complex and/or longer than what is illustrated in FIG. 2.

Once the dialog flow is created, the system may determine whether the conversational specification is finished at 104. Determining if the conversational specification is finished may include determining if the designer has provided input indicating that the dialog flow is complete. Once the dialog flow is complete the conversational specification can be created from the intent and the dialog flow. If the system determines that the conversational specification is not finished at 104, the system may continue generating the dialog flow at 106. If, however, the conversational specification is finished at 104, the system may provide the conversational agent within the workspace at 105. Specifically, the system may provide a conversational agent that is programmed with the conversational specification within the workspace for deployment.

Thus, the described system and method provide a significant technical improvement to conventional conversational agent generation systems, rather than relying on the mostly manual process of generating a conversational agent. As opposed to conventional techniques which require a developer to provide dialog nodes and identify a dialog flow, the described system can provide suggestions for dialog nodes to be included in a dialog flow and a sequence for the dialog flow, thereby providing a conversational agent that is more similar to an interaction between a user and a human agent. Thus, the described conversational agent generation system is more efficient and provides a more effective conversational agent than conventional systems.

Figure 3:
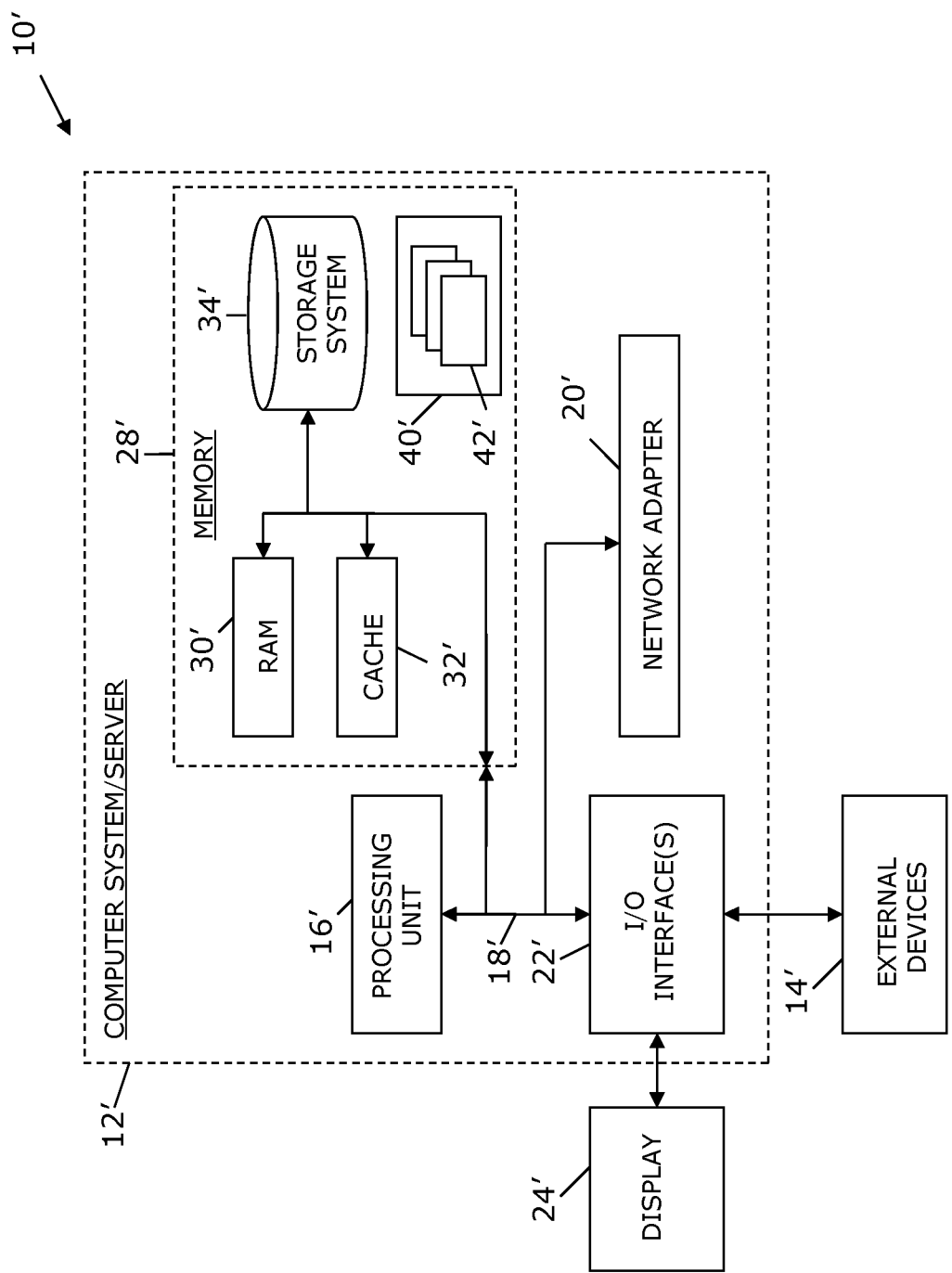
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
obtaining a plurality of conversational logs, each of the conversational logs representing interactions between at least one user and at least one human agent;
generating, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance;
providing a workspace for a conversational agent, wherein the workspace provides an interface for an agent designer to generate a conversational specification for the conversational agent, wherein the workspace allows user interaction with icons within the workspace, wherein the workspace displays a current dialog flow having intents and aspects represented by icons within the workspace and wherein the current dialog flow is updated responsive to receiving user interaction with intents and aspects displayed within the workspace, thereby updating the conversational specification, wherein the conversational specification identifies (i) at least one intent of the conversational agent and (ii) a dialog flow for the conversational agent, wherein the generating a conversational specification comprises:
receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs;
providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and
generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and
providing, within the conversational agent workspace, the conversational agent having the conversational specification for deployment.

2. The method of claim 1, wherein the generating comprises generating a deep learning model using the plurality of conversational logs, wherein the deep learning model is based upon a sequence of utterances within the conversational logs.

3. The method of claim 1, wherein the generating comprises generating an index structure using the plurality of conversational logs, wherein the index structure identifies (i) a plurality of sequences of utterances contained within the plurality of conversational logs and (ii) an output utterance for each of the plurality of sequences of utterances.

4. The method of claim 1, wherein the at least one suggestion of intents is generated by organizing utterances provided by users within the conversational logs into clusters based upon a similarity of utterances within the cluster.

5. The method of claim 4, wherein the at least one suggestion of intents is presented with (i) examples of utterances corresponding to the cluster and (ii) a number of utterances clustered within the cluster.

6. The method of claim 1, wherein the receiving a selection of one of the at least one suggestion comprises (i) receiving a selection of a plurality of the at least one suggestion and (ii) receiving a priority of response of the selected plurality of the at least one suggestion.

7. The method of claim 1, wherein the receiving a selection of at least one intent comprises receiving, from the agent designer, a user-created-intent.

8. The method of claim 7, wherein the receiving a selection of at least one intent comprises providing, from the plurality of conversational logs, examples of utterances similar to the user-created-intent.

9. The method of claim 1, wherein the receiving at least one selection of at least one aspect is responsive to (i) providing the selected dialog node to the user emulator and (ii) receiving a response from the dialog node comprising a suggested aspect.

10. The method of claim 1, wherein the receiving a selection of at least one intent comprises (i) receiving a selection of more than one intent and (ii) combining the more than one intent to form a composite intent.

11. An apparatus, comprising:
at least one processor; and
a computer readable storage medium having computer readable program code embodied therewith and executable by the at least one processor, the computer readable program code comprising:
computer readable program code configured to obtain a plurality of conversational logs, each of the conversational logs representing interactions between at least one user and at least one human agent;
computer readable program code configured to generate, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance;
computer readable program code configured to provide a workspace for a conversational agent, wherein the workspace provides an interface for an agent designer to generate a conversational specification for the conversational agent, wherein the workspace allows user interaction with icons within the workspace, wherein the workspace displays a current dialog flow having intents and aspects represented by icons within the workspace and wherein the current dialog flow is updated responsive to receiving user interaction with intents and aspects displayed within the workspace, thereby updating the conversational specification, wherein the conversational specification identifies (i) at least one intent of the conversational agent and (ii) a dialog flow for the conversational agent, wherein the generating a conversational specification comprises:
receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs;
providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and
generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and
computer readable program code configured to provide, within the conversational agent workspace, the conversational agent having the conversational specification for deployment.

12. A computer program product, comprising:
a computer readable storage medium having computer readable program code embodied therewith, the computer readable program code executable by a processor and comprising:
computer readable program code configured to obtain a plurality of conversational logs, each of the conversational logs representing interactions between at least one user and at least one human agent;
computer readable program code configured to generate, based on the plurality of conversational logs, (i) a human agent emulator and (ii) a user emulator, wherein one of the human agent emulator and the user emulator provides a possible next utterance in a conversation that includes a sequence of back-and-forth utterances between the at least one user and the at least one human agent up to the next possible utterance;
computer readable program code configured to provide a workspace for a conversational agent, wherein the workspace provides an interface for an agent designer to generate a conversational specification for the conversational agent, wherein the workspace allows user interaction with icons within the workspace, wherein the workspace displays a current dialog flow having intents and aspects represented by icons within the workspace and wherein the current dialog flow is updated responsive to receiving user interaction with intents and aspects displayed within the workspace, thereby updating the conversational specification, wherein the conversational specification identifies (i) at least one intent of the conversational agent and (ii) a dialog flow for the conversational agent, wherein the generating a conversational specification comprises:
receiving, within the conversational agent workspace, a selection, by the agent designer, of at least one intent of the conversational agent, wherein the receiving a selection is responsive to the conversational agent workspace providing at least one suggestion corresponding to at least one intent, the at least one suggestion generated by mining the plurality of conversational logs;
providing, within the conversational agent workspace, at least one suggestion for a dialog node that corresponds to the selected at least one intent, wherein the at least one suggestion for a dialog node is generated by (i) providing the selected intent to the agent emulator and (ii) receiving a possible utterance response from the agent emulator; and
generating, responsive to receiving a selection of one of the least one suggestion, a dialog flow for the conversational agent, wherein the generating comprises iteratively (i) receiving, from the agent designer, selection of at least one aspect corresponding to the intent, (ii) providing at least one suggestion for a dialog node, and (iii) receiving at least one selection of the at least one suggestion for dialog nodes; and
computer readable program code configured to provide, within the conversational agent workspace, the conversational agent having the conversational specification for deployment.

13. The computer program product of claim 12, wherein the generating comprises generating a deep learning model using the plurality of conversational logs, wherein the deep learning model is based upon a sequence of utterances within the conversational logs.

14. The computer program product of claim 12, wherein the generating comprises generating an index structure using the plurality of conversational logs, wherein the index structure identifies (i) a plurality of sequences of utterances contained within the plurality of conversational logs and (ii) an output utterance for each of the plurality of sequences of utterances.

15. The computer program product of claim 12, wherein the at least one suggestion of intents is generated by organizing utterances provided by users within the conversational logs into clusters based upon a similarity of utterances within the cluster; and
   wherein the at least one suggestion of intents is presented with (i) examples of utterances corresponding to the cluster and (ii) a number of utterances clustered within the cluster.

16. The computer program product of claim 12, wherein the receiving a selection of one of the at least one suggestion comprises (i) receiving a selection of a plurality of the at least one suggestion and (ii) receiving a priority of response of the selected plurality of the at least one suggestion.

17. The computer program product of claim 12, wherein the receiving a selection of at least one intent comprises receiving, from the agent designer, a user-created-intent; and
   wherein the receiving a selection of at least one intent comprises providing, from the plurality of conversational logs, examples of utterances similar to the user-created-intent.

18. The computer program product of claim 12, wherein the receiving at least one selection of at least one aspect is responsive to (i) providing the selected dialog node to the user emulator and (ii) receiving a response from the dialog node comprising a suggested aspect.

19. The computer program product of claim 12, wherein the receiving a selection of at least one intent comprises (i) receiving a selection of more than one intent and (ii) combining the more than one intent to form a composite intent.

20. A method, comprising:
   providing a workspace for generating a conversational agent to interact with users, wherein the workspace provider an interface for the conversational agent to generate a conversational specification for the conversational agent, wherein the workspace allows user interaction with icons within the workspace, wherein the workspace displays a current dialog flow having objectives and dialog nodes represented by icons within the workspace and wherein the current dialog flow is updated responsive to receiving user interaction with objectives and dialog nodes displayed within the workspace, thereby updating the conversational specification;
   receiving, within the workspace, an objective selection, by an agent designer, of an objective for the conversational agent, wherein the receiving an objective selection is responsive to providing, by the workspace, a suggestion for an objective created by mining a plurality of conversational logs detailing interactions between a user and a human agent;
   receiving, within the workspace, a node selection of a dialog node for the conversational agent by the agent designer, wherein the receiving a node selection is responsive to providing, by the workspace, a suggestion for a dialog node generated by providing the objective to an agent emulator that emulates a response of the agent identified from the plurality of conversational logs;
   creating, within the workspace, a dialog flow for the conversational agent by iteratively (i) providing intent suggestions corresponding to the objective selection, (ii) receiving selections of intent suggestions by the agent designer, and (iii) receiving node selections responsive to providing dialog node suggestions corresponding to the intent selections; and
   generating the conversational agent from a conversational specification generated from the dialog flow and the objective selection.

\* \* \* \* \*